3,418,423
FLUORINE-RESISTANT ELECTRICAL TERMINAL
Robert L. Bronnes, Irvington, Richard C. Sweet, North Tarrytown, and Ray C. Hughes, Ossining, N.Y., assignors to North American Philips Company, Inc., New York, N.Y., a corporation of Delaware
Filed Dec. 23, 1966, Ser. No. 604,387
6 Claims. (Cl. 174—152)

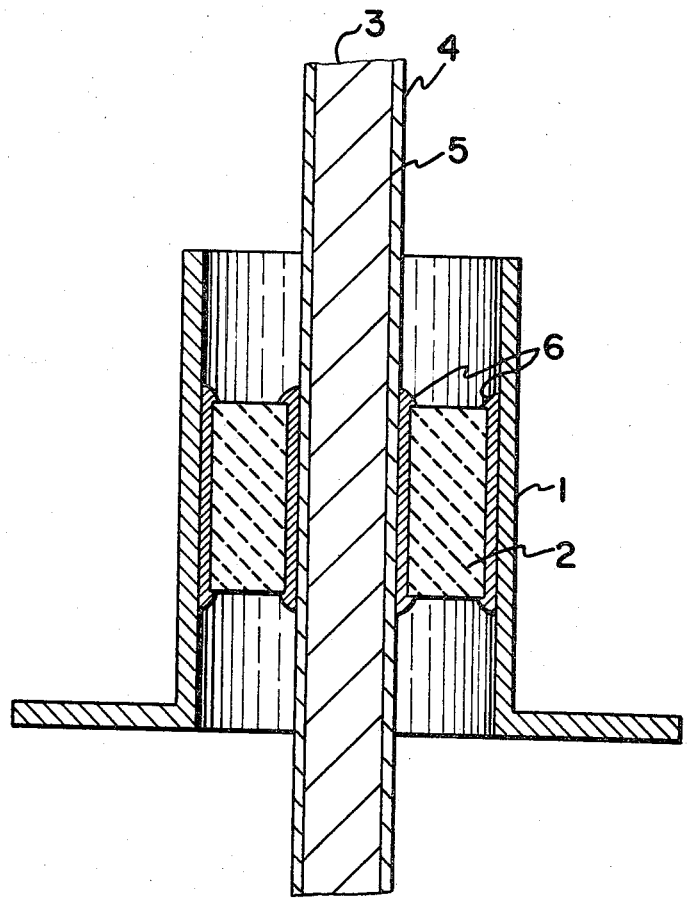

ABSTRACT OF THE DISCLOSURE

An electrically insulated terminal to introduce conductive leads into closed systems containing liquid and gaseous fluorine.

The terminal comprises an outer tubular corrosion-resistant metallic member such as stainless steel, an inserted metallized alumina ceramic member, and a central conductor consisting of a core of relatively plastic corrosion-resistant metal such as copper surrounded by a sleeve of more rigid corrosion-resistant metal such as stainless steel. The metallized portions of the ceramic member consist of successive layers of titanium, platinum and steel. Copper braze hermetically joins the metallized steel layers to the outer tubular member and to the sleeve.

---

The invention relates to an electrically insulated terminal resistant to attack by corrosive fluids, e.g., gaseous and liquid fluorine. More particularly, the invention relates to an electrically insulated terminal for introducing lead-in conductors into a closed system containing gaseous and liquid fluorine as well as hydro-fluoric acid.

There exists a need for electrically insulated terminals to introduce electrical conductors into closed systems containing liquid and gaseous fluorine. Glass and ceramic insulated terminals as previously known are not serviceable for this purpose because of reactivity of one or more of their constituents with liquid and gaseous fluorine.

It is known that, among electrical insulators, aluminum oxide is particularly resistant to fluorine. Of the metallic materials, magnesium, aluminum, iron, steel, stainless steels, copper, nickel, titanium, zirconium and tantalum are acceptably corrosion-resistant. Of these metals some are most suitable as electrical conductors but are difficult to join to the alumina and form a hermetic seal. Other of these metals lack ductility, or conductivity and hence are not particularly suitable for a terminal connection.

An object of this invention is to provide ceramic insulated terminals composed of materials resistant to attack by fluorine.

A further object of this invention is to provide a novel design of an electrical terminal for a container which is not only resistant to corrosive attack but which permits the construction of hermetic seals.

These and further objects of the invention will appear as the specification progresses.

In accordance with the invention, the terminal consists of an outer metal member of iron, nickel, or stainless steel, an insert of metallized high alumina ceramic, and a central conductor consisting of a copper core surrounded by a stainless steel sleeve or jacket. The three members are joined together by brazing with copper. During this process the stainless steel jacket is hermetically joined to the copper core.

The ceramic is metallized by deposition of successive layers of metal by cathode sputtering as disclosesd and claimed in copending application Ser. No. 301,866, filed Aug. 13, 1963, and application Ser. No. 510,017, filed Nov. 26, 1965. These layers consist, in sequence, of titanium, platinum, and stainless steel. The function of the stainless steel is to cover and protect the underlying layers of titanium and platinum from attack by fluorine.

The invention will be described with reference to the accompanying drawing, the sole figure of which shows a terminal according to the invention.

The terminal shown in the drawing comprises an outer member 1 of stainless steel, an inserted member 2 of $Al_2O_3$ and a central conductor consisting of a copper core 3 surrounded by a stainless steel jacket or sleeve 4 bonded thereto. Alumina member 2 is provided with successive layers 6 of cathodically deposited titanium, platinum and stainless steel which is copper brazed to the central conductor 5 and the outer member 1.

This terminal may be incorporated into a fluorine containing vessel by welding, brazing, or suitably gasketed fittings.

An essential feature of this invention is the unique construction of the central conductor, a copper core surrounded by a stainless steel sleeve. All efforts to employ for that part a solid conductor of a single metal resistant to fluorine have failed. Solid conductors consisting of nickel, stainless steel, or nickel-iron alloy, fail to provide a hermetic joint to the ceramic member, due to their excessive contraction during cooling of the assembly following brazing. The tubular stainless steel member, filled with a relatively plastic body of copper, is better able to conform to the dimensions of the ceramic during temperature changes.

While the invention has been described with reference to specific examples and applications, other modifications will be apparent to those skilled in this art, without departing from the spirit and scope of the invention which is defined in the appended claims.

What is claimed is:

1. An electrical terminal assembly for a lead-in conductor to a container for corrosive fluids comprising a corrosion-resistant tubular outer metal member, an inserted metallized ceramic member within said outer member, and a central conductor consisting of a core of a relatively plastic corrosion-resistant, electrically-conductive metal and a sleeve of more rigid corrosion-resistant metal surrounding said core, said central conductor and said outer member being hermetically joined to said inserted ceramic member.

2. An electrically insulated terminal as claimed in claim 1, in which the central conductor and the insulating material are resistant to gaseous and liquid fluorine.

3. An electrically insulated terminal as claimed in claim 2, in which the sleeve is stainless steel.

4. An electrically insulated terminal as claimed in claim 3, in which the core is copper.

5. An electrically insulated terminal as claimed in claim 4, in which the ceramic is alumina.

6. An electrically insulated terminal as claimed in claim 5, in which metallized ceramic is ceramic with successive layers of titanium, platinum and steel, the latter layer being joined to the sleeve by copper braze.

References Cited

UNITED STATES PATENTS

| | | | |
|---|---|---|---|
| 2,163,408 | 6/1939 | Pulfrich | 287—189.365 |
| 2,617,068 | 11/1952 | Spinnler et al. | 174—50.61 X |
| 2,917,140 | 12/1959 | Omley. | |
| 3,107,756 | 10/1963 | Gallet. | |
| 3,336,433 | 8/1967 | Johnson et al. | 174—50.61 X |

FOREIGN PATENTS 903,824    8/1962    Great Britain.

LARAMIE E. ASKIN, *Primary Examiner.*

U.S. Cl. X.R.

29—195, 473.1; 174—50.61; 287—189.365